(No Model.)
G. JONES & H. W. TROGNITZ.
MIRROR FRAME.
No. 351,515. Patented Oct. 26, 1886.
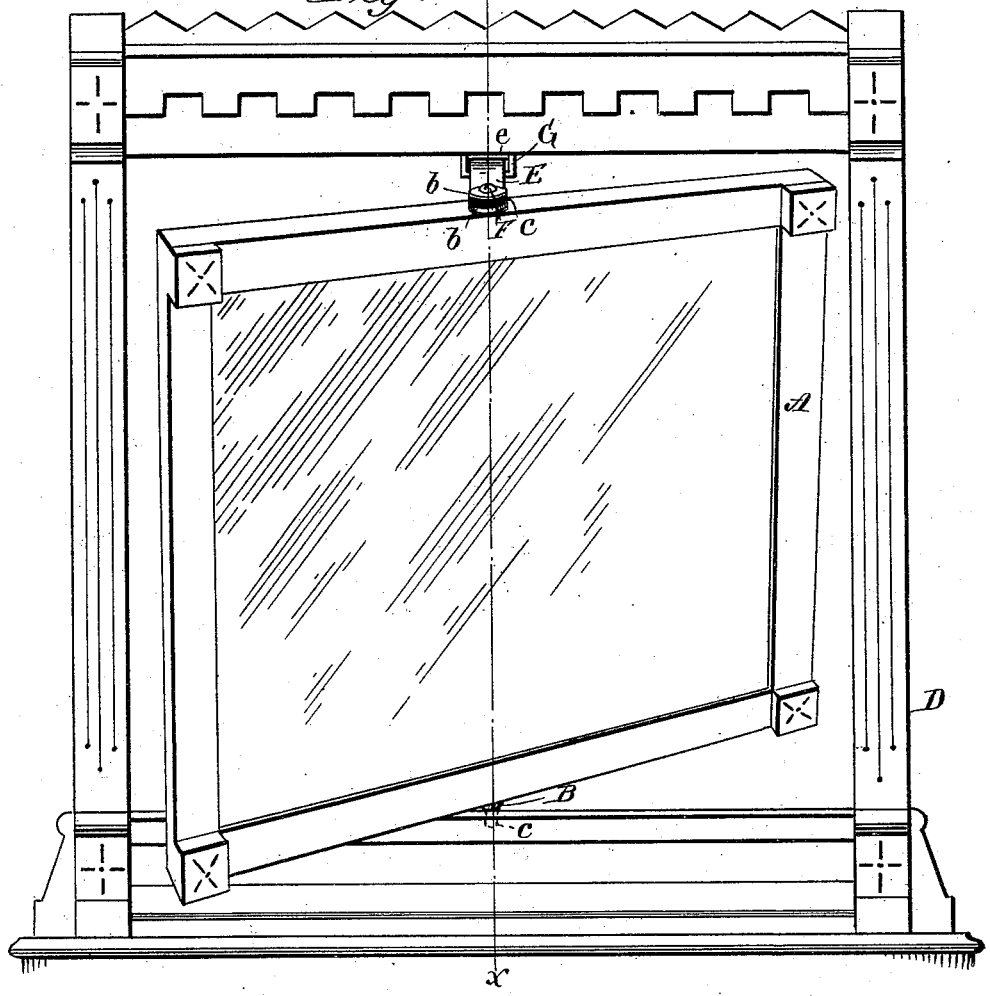
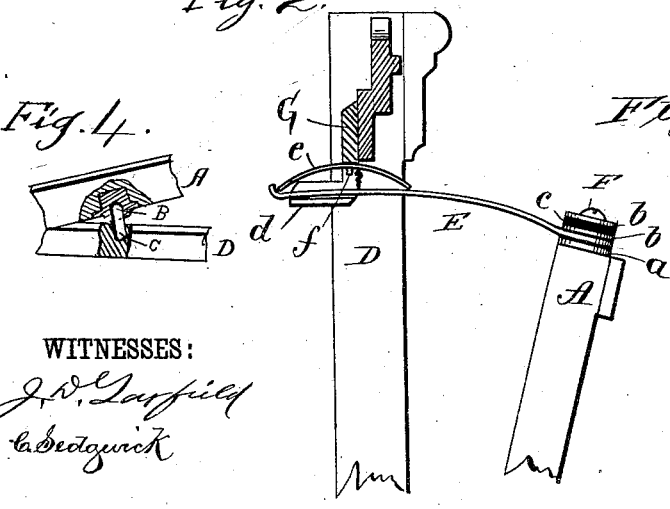
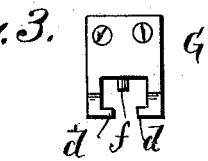
WITNESSES:
J. V. Garfield
C. Sedgwick
INVENTOR:
G. Jones
H. W. Trognitz
BY Munn & Co.
ATTORNEYS.

UNITED STATES PATENT OFFICE.

GEORGE JONES AND HERMAN W. TROGNITZ, OF WILLIAMSPORT, PA.

MIRROR-FRAME.

SPECIFICATION forming part of Letters Patent No. 351,515, dated October 26, 1886.

Application filed July 30, 1886. Serial No. 209,538. (No model.)

*To all whom it may concern:*

Be it known that we, GEORGE JONES and HERMAN W. TROGNITZ, of Williamsport, in the county of Lycoming and State of Pennsylvania, have invented a new and Improved Mirror-Frame, of which the following is a specification, reference being had to the annexed drawings, forming a part thereof, in which—

Figure 1 is a perspective view of our improved mirror-frame. Fig. 2 is a vertical section taken on line *x x* in Fig. 1. Fig. 3 is a detail view of the clutch for holding the mirror-supporting spring, and Fig. 4 is a detail sectional view of the lower pivot of the glass.

Similar letters of reference indicate corresponding parts in the different figures of the drawings.

The object of our invention is to provide a mirror-frame which may be tilted in a vertical plane, so as to incline it any desired angle, and turned upon central pivots when so inclined.

Our invention consists in the combination, with the mirror-frame, of a curved bar pivotally connected to the top thereof and extending through a spring-clutch adapted to hold it at any desired inclination; also, in the combination, with the mirror-frame, of a loose pivotal support at the bottom, which will permit the mirror to be inclined and turned upon its axis. The mirror-frame A is of the usual description, and is provided with a central socket, B, at the center of the lower edge thereof, which rests upon a pivotal pin, C, projecting from the center of the lower rail of the outside supporting-frame, D.

To the center of the upper edge of the mirror-frame is pivoted a curved bar, E, on the screw F, which enters the edge of the frame and binds the end of the bar down upon a washer, *a*, resting on the frame. Between the end of the curved bar and the edge of the screw F are placed two metallic washers, *b b*, having between them an elastic rubber washer, *c*, which causes the lower metal washer *b* to bear with sufficient pressure upon the end of the bar E to hold the frame A in any position in which it may be adjusted. The curved bar E passes through an angled casting, G, secured to the top rail of the frame D, and is pressed downward upon inwardly-projecting lips *d* of the casting by a bowed centrally-apertured spring, *e*, which is received on the stud *f*, projecting downward from the casting G. When the mirror is tilted, the curved bar E slides through the casting G under the pressure of the spring *e*, and when adjusted at the desired angle it may be turned on its pivots.

By means of our improvement the mirror may be adjusted at any desired angle in a vertical, horizontal, or inclined plane.

Having thus described our invention, what we claim as new, and desire to secure by Letters Patent, is—

1. The combination, with an outside supporting-frame, of a mirror-frame having its bottom bar loosely pivoted to the bottom bar of the outside frame, and a bar having one end pivoted to the top bar of the mirror-frame and held adjustably to slide on the upper bar of the outside frame, substantially as shown and described.

2. The combination, with the mirror-frame A and outside supporting-frame, D, of the curved bar E, pivotally connected with the mirror-frame A, and the casting G, adapted to receive the bar E, and provided with the spring *e*, substantially as shown and described.

3. The combination, with the mirror-frame A and outside supporting-frame, D, of the curved bar E, pivotally connected with the top of the mirror-frame, the casting G, provided with the inwardly-projecting lips *d* and stud *f*, the centrally-apertured spring *e*, received on the stud *f*, and the loose pivot formed of the pin C and socket B, substantially as shown and described.

4. The combination, with the mirror-frame A and outside supporting-frame, D, of the curved bar E, pivotally connected with the top of the mirror-frame, the casting G, provided with the inwardly-projecting lips *d* and stud *f*, the centrally-apertured spring *e*, received on the stud *f*, the metal washers *b b* and elastic washer *c*, and the loose pivot formed of the pin C and socket B, substantially as described.

GEORGE JONES.
HERMAN W. TROGNITZ.

Witnesses:
J. W. SWARTZ,
H. H. BLAIR.